United States Patent
Ko et al.

(10) Patent No.: US 12,261,308 B2
(45) Date of Patent: Mar. 25, 2025

(54) BUTTON CELL

(71) Applicant: SAMSUNG SDI CO., LTD., Yongin-si (KR)

(72) Inventors: Heejung Ko, Yongin-si (KR); Byongchul Woo, Yongin-si (KR); Kijung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/189,733

(22) Filed: Mar. 2, 2021

(65) Prior Publication Data

US 2021/0408626 A1 Dec. 30, 2021

(30) Foreign Application Priority Data

Jun. 25, 2020 (KR) .................. 10-2020-0078024

(51) Int. Cl.
*H01M 50/171* (2021.01)
*H01M 50/566* (2021.01)
*H01M 50/591* (2021.01)
*H01M 50/593* (2021.01)

(52) U.S. Cl.
CPC ....... *H01M 50/171* (2021.01); *H01M 50/566* (2021.01); *H01M 50/591* (2021.01); *H01M 50/593* (2021.01)

(58) Field of Classification Search
CPC ............. H01M 50/171; H01M 50/566; H01M 50/591; H01M 50/593; H01M 50/188; H01M 50/183
See application file for complete search history.

(56) References Cited

U.S. PATENT DOCUMENTS

| 4,804,593 A * | 2/1989 | Hara | H01M 50/172 |
| | | | 429/174 |
| 4,869,978 A * | 9/1989 | Kubo | H01M 50/154 |
| | | | 429/185 |
| 2007/0202397 A1 | 8/2007 | Cho | |

(Continued)

FOREIGN PATENT DOCUMENTS

| CN | 101030656 A | 9/2007 | |
| CN | 107732042 A * | 2/2018 | .......... H01M 10/052 |

(Continued)

OTHER PUBLICATIONS

Espacenet machine translation of Zhou (CN110459705A), cited on IDS of Dec. 30, 2021. (Year: 2019).*

(Continued)

*Primary Examiner* — Haroon S. Sheikh
*Assistant Examiner* — Katharine A Caughron
(74) *Attorney, Agent, or Firm* — Womble Bond Dickinson (US) LLP (57) ABSTRACT

A rechargeable battery includes: a case receiving an electrode assembly and including an opening; a cap assembly including a cap plate coupled to the case to cover the opening, and a terminal plate thermally fused to the cap plate by a thermal-fusion member, the thermal-fusion member electrically insulating the cap plate and the terminal plate from each other; and a sealing part attached to and located on a side of the thermal-fusion member, a side surface of the terminal plate, and an outer surface of the cap plate.

11 Claims, 4 Drawing Sheets

(56) References Cited

U.S. PATENT DOCUMENTS

| | | |
|---|---|---|
| 2009/0092897 A1 | 4/2009 | Lee |
| 2010/0003583 A1* | 1/2010 | Seong ................. H01M 50/186 |
| | | 29/623.2 |
| 2016/0315306 A1 | 10/2016 | Jang et al. |
| 2017/0207491 A1 | 7/2017 | Tamachi et al. |
| 2021/0075051 A1 | 3/2021 | Zhou |
| 2022/0052405 A1* | 2/2022 | Stevick ............. H01M 10/0422 |

FOREIGN PATENT DOCUMENTS

| | | | |
|---|---|---|---|
| CN | 110459705 A | 11/2019 | |
| EP | 1826840 A2 * | 8/2007 | .......... H01M 10/052 |
| EP | 3 926 739 A1 | 12/2021 | |
| JP | 2002231197 A * | 8/2002 | |
| JP | 2004-055372 A | 2/2004 | |
| KR | 10-2016-0059165 A | 5/2016 | |

OTHER PUBLICATIONS

Extended European Search Report issued in corresponding European Application No. 21171188.2, dated Oct. 14, 2021, 9 pages.
Chinese Office Action dated Feb. 29, 2024, issued in corresponding Chinese Patent Application No. 202110424861.2 (12 pages, including 6 pages of English translation).
European Office Action dated May 14, 2024, issued in corresponding European Patent Application No. 21171188.2 (4 pages).

* cited by examiner

BUTTON CELL

CROSS-REFERENCE TO RELATED APPLICATION

This application claims priority to and the benefit of Korean Patent Application No. 10-2020-0078024, filed on Jun. 25, 2020 in the Korean Intellectual Property Office, the entire content of which is incorporated herein by reference.

BACKGROUND

1. Field

Aspects of embodiments of the present invention relate to a rechargeable battery.

2. Description of the Related Art

A rechargeable battery can be repeatedly charged and discharged, unlike a primary battery that cannot be recharged. A low-capacity rechargeable battery is used for portable small-sized electronic devices, such as mobile phones, notebook computers, and camcorders. A large-capacity battery is widely used as a power source for driving motors, such as for hybrid vehicles.

A representative rechargeable battery includes a nickel-cadmium (Ni—Cd) battery, a nickel-hydrogen (Ni-MH) battery, a lithium (Li) battery, and a lithium ion (Li-ion) rechargeable battery. Particularly, the lithium ion secondary battery has a higher operation voltage than the nickel-cadmium battery or the nickel-hydrogen battery that is mainly used as a portable electric equipment power source by about three times. Also, the lithium ion secondary battery is widely used because its energy density per unit weight is high.

In particular, as a demand for wearable devices, such as headphones, earphones, smartwatches, and body-mounted medical devices which use Bluetooth, has increased, the demand for rechargeable batteries of which energy density is high and which are ultra-small is increasing.

The ultra-small rechargeable battery has important tasks of securing required electrical capacity within a limited size, implementing an efficient structure while improving an effective low weight, and improving structural stability.

The above information disclosed in this Background section is only for enhancement of understanding of the background of the invention, and, therefore, it may contain information that does not form the prior art that is already known in this country to a person of ordinary skill in the art.

SUMMARY

According to an aspect of embodiments of the present invention, an ultra-small rechargeable battery is provided. According to another aspect of embodiments of the present invention, a rechargeable battery that prevents or substantially prevents damage of a thermal-fusion member when attaching a terminal plate and a cap plate in an electrically insulating state is provided.

According to one or more embodiments, a rechargeable battery includes: a case receiving an electrode assembly and including an opening; a cap assembly including a cap plate coupled to the case to cover the opening, and a terminal plate thermally fused to the cap plate by a thermal-fusion member, the thermal-fusion member electrically insulating the cap plate and the terminal plate from each other; and a sealing part attached to and located on a side of the thermal-fusion member, a side surface of the terminal plate, and an outer surface of the cap plate.

The sealing part may include a portion of the thermal-fusion member further protruded than the side surface of the terminal plate between the terminal plate and the cap plate.

The sealing part may be formed of an ultraviolet ray (UV) hardening agent coating layer. The hardening agent coating layer may be formed on the side surface of the thermal-fusion member, the side surface of the flange part, and the outer surface of the cap plate.

The rechargeable battery may further include a housing covering the cap plate and coupled to the case, and an outer surface of the terminal plate may be further protruded than an outer surface of the housing to have a height difference.

A diameter direction outermost of the sealing part may extend from the outer surface of the cap plate to an inner end of a through hole formed in the housing.

The sealing part may increase a first moisture penetration path formed between the terminal plate and the thermal-fusion member to a part formed on the side surface of the terminal plate and a second moisture penetration path formed between the thermal-fusion member and the cap plate to a part formed on the outer surface of the cap plate.

The terminal plate may include: a flange part on the outer surface of the cap plate and electrically insulated from and attached to the outer surface of the cap plate; and a tab connection part protruded from a center of the flange part to be protruded toward the electrode assembly through a terminal hole of the cap plate and a through hole of the thermal-fusion member, and connected to an electrode tab of the electrode assembly at an inner surface of the terminal plate.

The sealing part may be formed on the side of the thermal-fusion member, a side surface of the flange part, and the outer surface of the cap plate.

As described above, in a rechargeable battery according to one or more embodiments of the present invention, the sealing part is formed and attached to the side surface of the thermal-fusion member, the side surface of the terminal plate, and the outer surface of the cap plate, and the first moisture penetration path formed between the terminal plate and the thermal-fusion member and the second moisture penetration path formed between the thermal-fusion member and the cap plate are long, and a minute short circuit due to moisture penetration may thereby be prevented or substantially prevented.

That is, the sealing part may effectively prevent moisture leakage in the thermal-fusion member. Therefore, it is possible to prevent or substantially prevent damage of the thermal-fusion member due to a repetition of minute short circuits, thereby improving the reliability of the rechargeable battery at high temperature and high humidity.

DESCRIPTION OF REFERENCE SYMBOLS

| | |
|---|---|
| 1, 2: rechargeable battery | 10: electrode assembly |
| 11: first electrode | 12: second electrode |
| 13: separator | 14: insulating sheet |
| 20: case | 21: opening |
| 31: cap plate | 34: thermal-fusion member |
| 35, 36: sealing part | 40: housing |
| 41: planar part | 42: side part |
| 51: first electrode tab | 52: second electrode tab |
| 60: cap assembly | 61: insulating member |
| 63: terminal plate | 101: first end |
| 102: second end | 301: exposed surface |
| 311: terminal hole | 341: through hole |
| 411: through hole | 631: flange part |
| 632: tab connection part | D: battery diameter (second diameter) |
| D3: first diameter | H: height |
| P1: extension part | P2: non-extension part |
| Pt1, Pt3: first moisture penetration path | |
| Pt2, Pt4: second moisture penetration path | |
| Pt5: connecting path | ΔH: height difference |

DETAILED DESCRIPTION

The present invention will be described more fully herein with reference to the accompanying drawings, in which some example embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

In addition, unless explicitly described to the contrary, it is to be understood that terms such as "comprises," "includes," or "have" used in the present specification specify the presence of stated features, numerals, steps, operations, components, parts, or a combination thereof, but do not preclude the presence or addition of one or more other features, numerals, steps, operations, components, parts, or a combination thereof.

Also, in this specification, it is to be understood that when one component is referred to as being "connected" or "coupled" to another component, it may be connected or coupled directly to the other component or connected or coupled to another component with one or more other components intervening therebetween.

Singular forms are to include plural forms unless the context clearly indicates otherwise.

It is to be understood that, although the terms "first," "second," etc. may be used herein to describe various elements, these elements should not be limited by these terms. These terms are used to distinguish one element from another. For example, a first element could be termed a "second" element, and, similarly, a second element could be termed a "first" element, without departing from the scope of example embodiments of the inventive concept. The terms of a singular form may include plural forms unless the context clearly indicates otherwise.

In addition, terms such as "below," "lower," "above," "upper," and the like are used to describe the relationship of the configurations shown in the drawings. However, the terms are used as a relative concept and are described with reference to the direction indicated in the drawings.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

A rechargeable battery according to an embodiment of the present invention, which is an ultra-compact battery, may be a coin cell or a button cell. Here, the coin cell or the button cell is a thin coin-type or button-type cell, and refers to a battery having a ratio (H/D) of a height (H) to a diameter (D) of 1 or less (see FIG. 1).

In an embodiment, the coin cell or the button cell is mainly cylindrical, and a horizontal cross-section is circular, but the present invention is not limited thereto, and a horizontal cross-section may be oval or polygonal. In this case, a diameter is determined as a maximum distance of a housing (or a case) exterior circumference based on the horizontal direction of the battery, and a height is determined as a maximum distance (a distance from a bottom to a top cross-section) based on the vertical direction of the battery.

However, the present invention is not limited to the coin cell or the button cell that is an example of the present invention, and a battery of the present invention may be a cylindrical-type or pin-type battery. Herein, a case in which a rechargeable battery according to an embodiment of the present invention is a coin cell or a button cell will be described as an example in further detail.

Figure 1:
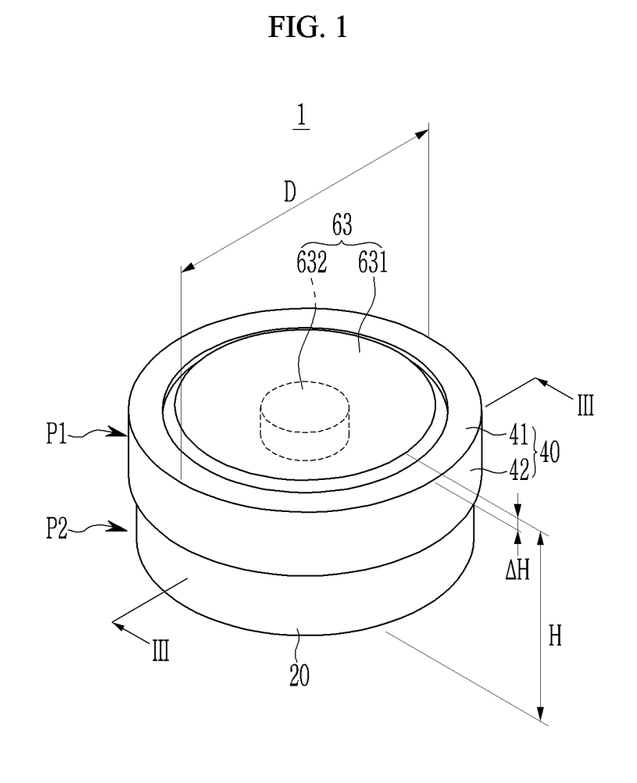
FIG. 1 is a perspective view showing a rechargeable battery according to an embodiment of the present invention.
Figure 2:
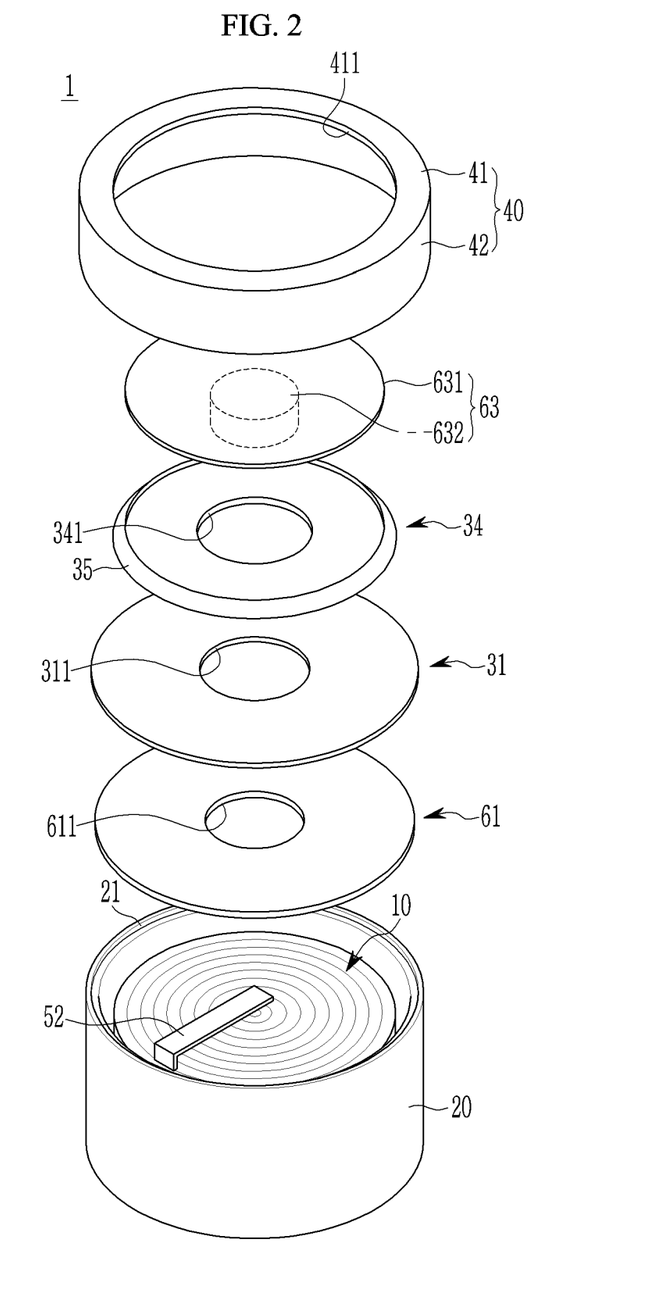
FIG. 2 is an exploded perspective view of the rechargeable battery of FIG. 1.
Figure 3:
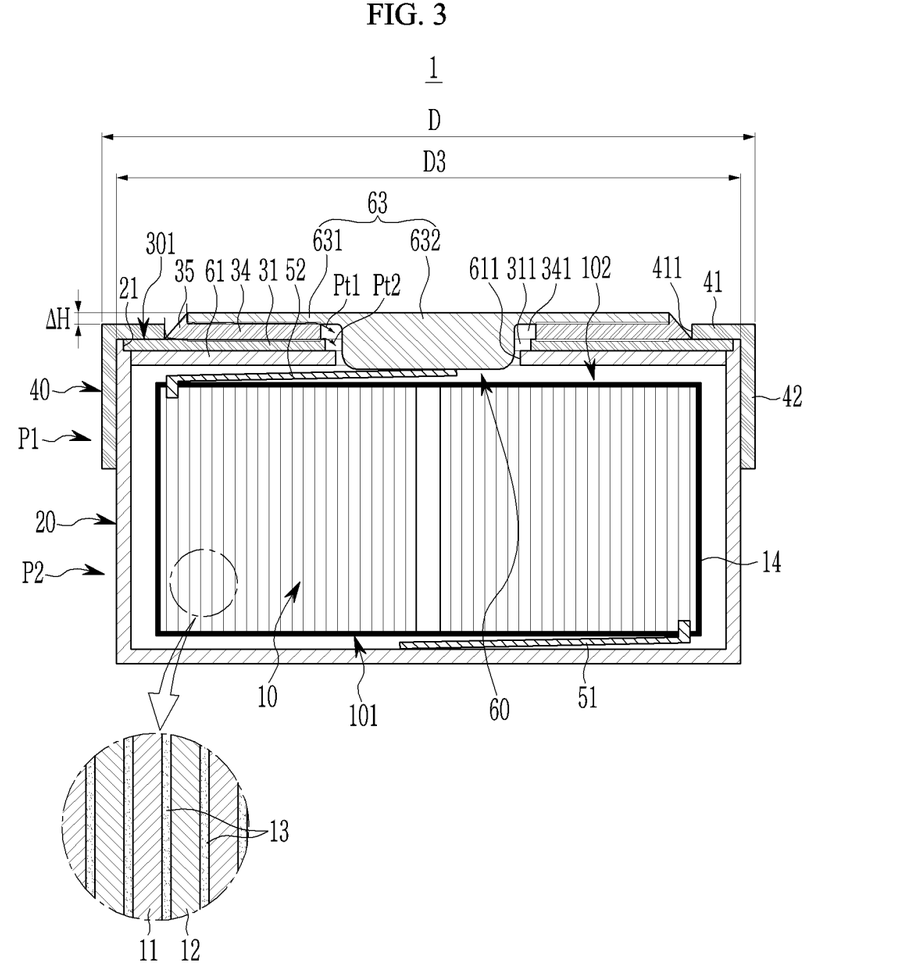
FIG. 3 is a cross-sectional view taken along the line III-III of FIG. 1.

FIG. 1 is a perspective view showing a rechargeable battery according to an embodiment of the present invention; FIG. 2 is an exploded perspective view of the rechargeable battery of FIG. 1; and FIG. 3 is a cross-sectional view taken along the line III-III of FIG. 1. Referring to FIG. 1 to FIG. 3, a rechargeable battery 1 according to an embodiment includes an electrode assembly 10, a case 20, a cap assembly 60, and a sealing part 35. Also, the rechargeable battery 1 may further include a housing 40.

The cap assembly 60 includes a cap plate 31 and a terminal plate 63 that are combined together. As an example, the cap plate 31 and the terminal plate 63 are thermally fused by a thermal-fusion member 34 disposed therebetween.

The thermal-fusion member 34 acts as a medium to connect the cap plate 31 and the terminal plate 63 to each other. In an embodiment, for example, the thermal-fusion member 34 may be formed of an electrically insulating material, such as a polymer, and may be melted using a laser or the like to be fused to the cap plate 31 and the terminal plate 63.

In an embodiment, by coupling the terminal plate 63 to the cap plate 31 with the thermal-fusion member 34, it is possible to form a stable coupling structure while effectively insulating between the terminal plate 63 and the cap plate 31 without adding a separate insulating configuration.

Since a coin cell is manufactured in an ultra-compact size, it may have a design limitation in terms of space, and, accordingly, it is desirable to secure functionality while simplifying a structure and a manufacturing process thereof. Regarding this, in an embodiment, insulation and coupling between the terminal plate 63 and the cap plate 31 through the heat-fusion member 34 are realized.

In an embodiment, the electrode assembly 10 includes a first electrode 11 (for example, a negative electrode) and a second electrode 12 (for example, a positive electrode) provided at respective sides of a separator 13 that is an electrically insulating material, and is formed by winding the first electrode 11, the separator 13, and the second electrode 12. Therefore, the electrode assembly 10 may be formed as a jelly roll type. In an embodiment, although not shown separately, the electrode assembly may be formed as a stack type.

The electrode assembly 10 is configured to charge and discharge a current, and a winding axis in the electrode assembly 10 may be arranged parallel to a height direction (a vertical direction in FIG. 1 to FIG. 3) of the case 20. In an embodiment, a first end (a lower surface of the electrode assembly) 101 and a second end (an upper surface of the electrode assembly) 102 of the electrode assembly 10 may be flat and parallel to each other. In an embodiment, the electrode assembly 10 is not provided with a center pin, but a center pin (not shown) may be provided at a position of the winding axis.

The case 20 accommodates the electrode assembly 10 while facing the first end 101 of the electrode assembly 10. In an embodiment, the electrode assembly 10 is covered with an insulating sheet 14 and embedded in the case 20. As an example, the case 20 is formed as a cylinder that accommodates the jelly roll type of electrode assembly 10, and the cap assembly 60 seals an opening 21 of the cylindrical case 20.

The electrode assembly 10 includes a first electrode tab 51 connected to the first electrode 11 and a second electrode tab 52 connected to the second electrode 12, and the first and second electrodes 11 and 12 are drawn out at the first and second ends 101 and 102, respectively.

In a state in which the electrode assembly 10 is accommodated in the case 20, the first electrode tab 51 is electrically connected to a bottom of the case 20 and the second electrode tab 52 is electrically connected to the terminal plate 63 of the cap assembly 60.

In addition, the cap plate 31 of the cap assembly 60, while facing the second end 102 of the electrode assembly 10, is coupled to the case 20 to cover the opening 21. In this way, the terminal plate 63 is coupled to the second electrode tab 52 while being coupled to the cap plate 31 with the thermal-fusion member 34.

Herein, a case in which the first electrode 11 and the second electrode 12 are respectively a negative electrode and a positive electrode will be described as an example, but the present invention is not limited thereto, and the first electrode 11 and the second electrode 12 may respectively be a positive electrode and a negative electrode.

In an embodiment, the first electrode (negative electrode) 11 is formed in a long extending strip shape, and includes a negative coated portion that is a region in which a negative active material layer is coated to a current collector of a metal foil (for example, a Cu foil) and a negative uncoated portion that is a region in which an active material is not coated. In an embodiment, the negative uncoated portion may be disposed at an end portion in a length direction of the negative electrode.

In an embodiment, the second electrode (the positive electrode) 12 is formed in a long extending strip shape, and includes a positive electrode coated portion that is a region in which a positive active material layer is coated to a current collector of a metal foil (for example, an Al foil) and a positive uncoated portion that is a region in which an active material is not coated. In an embodiment, the positive uncoated portion may be disposed at an end portion in a length direction of the positive electrode.

The case 20 allows the electrode assembly 10 to be inserted into the opening 21 formed at a side thereof, and has a space for accommodating the electrode assembly 10 and an electrolyte therein. In an embodiment, for example, the case 20 is formed in a cylindrical shape having a height H that is less than a diameter D thereof, and has a circular opening 21 such that the cylindrical electrode assembly 10 corresponding to an inner space thereof is inserted.

The terminal plate 63 of the cap assembly 60 includes a flange part 631 and a tab connection part 632. The flange part 631 is disposed on the outside of the cap plate 31 and is electrically insulated from and attached to an outer surface of the cap plate 31.

The housing 40 is provided to prevent or substantially prevent a reverse direction insertion when assembling the rechargeable battery 1 into a set. As an example, the housing 40 covers the cap plate 31 and is coupled to the case 20 to form an extension part P1 in the rechargeable battery 1. In an embodiment, on the cap plate 31, a part of the outer surface is covered with the flange part 631, and a flat surface (an exposed surface, 301) of a remaining part of the outer surface is covered with the housing 40.

In the terminal plate 63, the tab connection part 632 is protruded from a center of the flange part 631 to the inside and penetrates a through hole 341 of the thermal-fusion member 34 and a terminal hole 311 of the cap plate 31 to be protruded toward the electrode assembly 10, and the second electrode tab 52 is electrically connected to an inner surface of the tab connection part 632.

In an embodiment, the flange part 631 is protruded more with a height difference ΔH than an outer surface of the housing 40 to form an outer surface of the rechargeable battery 1. In other words, the outer surface of flange part 631 is more protruded than the outer surface of the cap plate 31 with reference to a bottom of the case 20. In an embodiment, an outer surface of the flange part 631 and the outer surface of the housing 40 form planes spaced apart from each other in the diameter direction while having the height difference ΔH.

For example, the housing 40 includes a planar part 41 and a side part 42. The planar part 41 has a through hole 411 and is configured to cover the exposed surface 301 of the outer surface of the cap plate 31 while exposing the flange part 631 of the terminal plate 63. The side part 42 extends along a side of the case 20 at the outside of the planar part 41 to cover a part of the side of the case 20 and to be coupled to the side of the case 20. In the rechargeable battery 1, a part where the housing 40 is combined forms an extension part P1, and a part without the housing 40 forms a non-extension part P2.

Accordingly, the housing 40 covers the exposed surface 301 of the cap plate 31 and is coupled to the case 20, thereby forming the extension part P1. That is, the housing 40 forms a step at a side surface of the case 20 by the extension part P1. The extension part P1 relatively increases the height or the diameter compared with the non-extension part P2.

In an embodiment, in the case 20, the housing 40 is not joined at a lower part, so as to have a first diameter D3 between the outer sides in the diameter direction of the case 20. The housing 40 is attached to the upper part of the case 20 and defines a second diameter (the same as the battery diameter D) between the exterior sides of the housing 40 in the diameter direction. The second diameter D is set to be larger than the first diameter D3. Therefore, there is a difference in the diameter between the upper part and the lower part of the rechargeable battery 1.

In an embodiment, the housing 40 may be formed of an electrically insulating material to prevent or substantially prevent an electrical short circuit between the outer surface of the flange part 631 and the outer surface of the cap plate 31. For example, the housing 40 may be formed of polypropylene (PP), polyethylene (PE), polyethylene terephthalate (PET), polyethylene naphthalate (PEN) resin, or rubber. Although not illustrated, any of suitable synthetic resins or electrically insulating materials may be applied to the housing 40.

An insulating member 61 is disposed on an upper side of the second electrode tab 52 and attached to an inner surface of the cap plate 31. The insulating member 61 may form an electrically insulating structure between the cap plate 31 and the second electrode tab 52 and between the cap plate 31 and the electrode assembly 10.

As an example, the insulating member 61 has a through hole 611 corresponding to the terminal hole 311 of the cap plate 31. Therefore, the tab connection part 632 is protruded from the center of the flange part 631 to the inside to be protruded toward the electrode assembly 10 through the terminal hole 311 of the cap plate 31 and the through hole 611 of the insulating member 61, and is electrically connected to the second electrode tab 52 at an inner surface of the tab connection part 632.

The insulating member 61 and the insulating sheet 14 electrically insulate both sides of the second electrode tab 52 from the cap plate 31 and the electrode assembly 10. The insulating sheet 14 electrically insulates the first electrode tab 51 and the electrode assembly 10.

Referring to FIG. 1, In the rechargeable battery 1 of an embodiment, the height H is set as the distance between an outer plane of the case 20 and the flange part 631 in a state in which the opening 21 of case 20 is closed and sealed with the cap assembly 60, and the battery diameter D is set as the exterior circumference of the housing 40. In an embodiment, a ratio of the height H to the battery diameter D is 1 or less (H/D≤1). Therefore, the rechargeable battery 1 of an embodiment is a coin-type battery or a button-type battery and may form a thin coin or button shape.

In an embodiment, the sealing part 35 is attached and formed to a side surface of the thermal-fusion member 34, a side surface of the terminal plate 63, and the outer surface of the cap plate 31. That is, the sealing part 35 may be further formed on a remaining part after the housing 40 is coupled among the exposed surface 301 of the cap plate 31. In an embodiment, the sealing part 35 is formed on the side surface of the thermal-fusion member 34, the side surface of the flange part 631, and the outer surface of the cap plate 31.

The sealing part 35 is connected to the thermal-fusion member 34 and is formed of the thermal-fusion member 34 that protrudes more than the side surface of the terminal plate 63 between the flange part 631 of the terminal plate 63 and the cap plate 31. That is, the sealing part 35 is integrally formed with the thermal-fusion member 34.

In an embodiment, for example, a heat-fused material made of polypropylene (PP) may be disposed between the flange part 631 of the terminal plate 63 and the cap plate 31 and a jig (not shown) may be installed on the outer part of the upper surface of the cap plate 31, and then the flange part 631 of the terminal plate 63 may be pressed to form the thermal-fusion member 34.

Also, the sealing part 35 is protruded to the outside while forming the thermal-fusion member 34, and is integrally formed and attached to the side surface of the flange part 631 of the terminal plate 63 and the outer surface of the cap plate 31.

In an embodiment, the outermost diameter direction of the sealing part 35 extends from the outer surface of the cap plate 31 to the inner end of the through hole 411 formed in the housing 40. Therefore, the sealing part 35 increases a first moisture penetration path Pt1 and a second moisture penetration path Pt2 via the thermal-fusion member 34.

That is, the first moisture penetration path Pt1 is formed between the flange part 631 of the terminal plate 63 and the thermal-fusion member 34, and the sealing part 35 increases the first moisture penetration path Pt1 formed on the side surface of the flange part 631 of the terminal plate 63.

The second moisture penetration path Pt2 is formed between the cap plate 31 and the thermal-fusion member 34, and the sealing part 35 increases the second moisture penetration path Pt2 formed on the cap plate 31.

The first and second moisture penetration paths Pt1 and Pt2 by the sealing part 35 further prevent or substantially prevent a leakage of moisture through the thermal-fusion member 34, and damage of the thermal-fusion member 34 due to the occurrence of minute shorts by the moisture leakage may be prevented or substantially prevented. Accordingly, reliability of the rechargeable battery 1 may be improved at high temperature and high humidity.

Herein, another embodiment of the present invention will be described. Descriptions of the same configurations as the above-described embodiment may be omitted, and different configurations are mainly described in the following embodiment.

Figure 4:
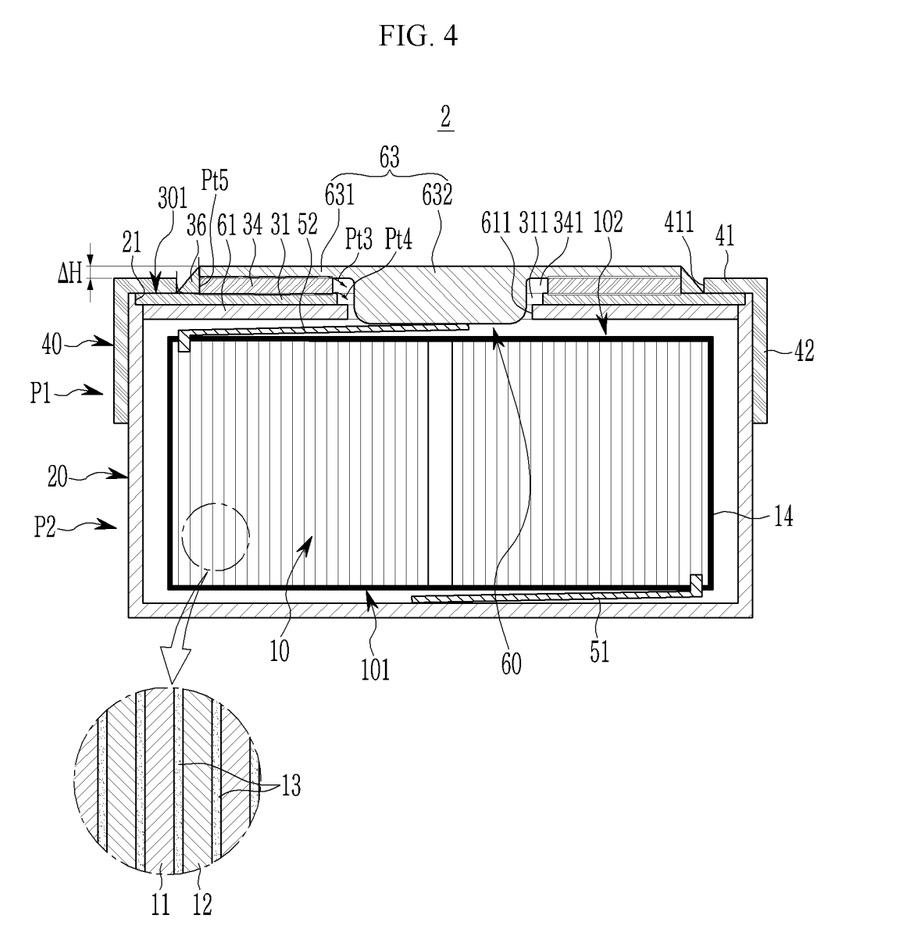
FIG. 4 is a cross-sectional view of a rechargeable battery according to another embodiment of the present invention.

FIG. 4 is a cross-sectional view of a rechargeable battery according to another embodiment of the present invention. Referring to FIG. 4, in a rechargeable battery 2 of another embodiment, a sealing part 36 may be formed of an ultraviolet ray (UV) hardening agent coating layer. The sealing part 36, that is, the UV hardening agent coating layer, is formed on the side surface of the thermal-fusion member 34, the side surface of the flange part 631, and the outer surface of the cap plate 31. Therefore, the sealing part 36 increases a first moisture penetration path Pt3 and a second moisture penetration path Pt4 via the thermal-fusion member 34.

That is, the first moisture penetration path Pt3 is formed between the flange part 631 of the terminal plate 63 and the thermal-fusion member 34, and the sealing part 36 increases the first moisture penetration path Pt3 formed on the side surface of the flange part 631 of the terminal plate 63.

The second moisture penetration path Pt4 is formed between the cap plate 31 and the thermal-fusion member 34, and the sealing part 36 increases the second moisture penetration path Pt4 formed on the cap plate 31.

The first and second moisture penetration paths Pt3 and Pt4 by the sealing part 36 further prevent or substantially prevent the leakage of moisture through the thermal-fusion member 34, and damage of the thermal-fusion member 34 due to the occurrence of minute shorts caused by the moisture leakage may be prevented or substantially prevented. The reliability of the rechargeable battery 2 may be improved at high temperature and high humidity.

In addition, the sealing part 36 mutually connects the first and second moisture penetration paths Pt3 and Pt4 with a path Pt5 for a connection at the connected part of the side surface of the thermal-fusion member 34, and, thereby, the first and second moisture penetration paths Pt3 and Pt4 may be further increased.

While the present invention has been described in connection with what are presently considered to be some practical example embodiments, it is to be understood that the invention is not limited to the disclosed embodiments. On the contrary, it is intended to cover various modifications and equivalent arrangements included within the spirit and scope of the appended claims.

What is claimed is:

1. A button cell comprising:
   a case receiving an electrode assembly and comprising an opening;
   a cap assembly comprising a cap plate coupled to the case to cover the opening, and a terminal plate thermally fused to the cap plate by a thermal-fusion member, the thermal-fusion member electrically insulating the cap plate and the terminal plate from each other;
   a sealing part attached to and located on a side of the thermal-fusion member, a side surface of the terminal plate, and an outer surface of the cap plate; and
   a housing coupled to the case and covering the cap plate in a height direction of the button cell, the housing being entirely spaced outside the terminal plate in a diameter direction of the button cell,
   wherein, in the diameter direction of the button cell, the sealing part is located entirely inside a through hole of the housing, and
   wherein the terminal plate comprises:
   a flange part on the cap plate and electrically insulated from and attached to the cap plate; and
   a tab connection part protruded from a center of the flange part through a terminal hole of the cap plate and a through hole of the thermal-fusion member and connected to an electrode tab of the electrode assembly at an inner surface of the terminal plate, wherein, in the terminal hole of the cap plate, the tab connection part is spaced apart from the thermal-fusion member.

2. The button cell of claim 1, wherein the sealing part comprises a portion of the thermal-fusion member further protruded than the side surface of the terminal plate between the terminal plate and the cap plate.

3. The button cell of claim 1, wherein the sealing part comprises an ultraviolet ray hardening agent coating layer.

4. The button cell of claim 3, wherein the ultraviolet ray hardening agent coating layer is located on the side of the thermal-fusion member, the side surface of the terminal plate, and the outer surface of the cap plate.

5. The button cell of claim 1,
   wherein an outer surface of the terminal plate is further protruded than an outer surface of the housing to have a height difference.

6. The button cell of claim 5, wherein, in the diameter direction, the sealing part extends on the outer surface of the cap plate to an inner end of the through hole formed in the housing.

7. The button cell of claim 5, wherein the sealing part increases a first moisture penetration path formed between the terminal plate and the thermal-fusion member to a part formed on the side surface of the terminal plate and a second moisture penetration path formed between the thermal-fusion member and the cap plate to a part formed on the outer surface of the cap plate.

8. The button cell of claim 1, wherein
   the flange part is on the outer surface of the cap plate and electrically insulated from and attached to the outer surface of the cap plate.

9. The button cell of claim 8, wherein the sealing part is formed on the side of the thermal-fusion member, a side surface of the flange part, and the outer surface of the cap plate.

10. The button cell of claim 6, wherein, in the diameter direction, the sealing part extends on the outer surface of the cap plate from the side surface of the terminal plate to the inner end of the through hole formed in the housing.

11. The button cell of claim 1, wherein the housing is non-overlapping with the terminal plate in the height direction of the button cell.

* * * * *